United States Patent
Jeong et al.

(10) Patent No.: US 9,888,408 B2
(45) Date of Patent: *Feb. 6, 2018

(54) APPARATUS AND METHOD FOR CONTROLLING CONTROL OVERLOAD IN WLAN SYSTEMS

(71) Applicant: Samsung Electronics Co., Ltd, Gyeonggi-do (KR)

(72) Inventors: Sang Soo Jeong, Gyeonggi-do (KR); Song Yean Cho, Seoul (KR); Beom Sik Bae, Gyeonggi-do (KR); Young Kyo Baek, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,391

(22) Filed: Nov. 14, 2016

(65) Prior Publication Data

US 2017/0064581 A1    Mar. 2, 2017

Related U.S. Application Data

(63) Continuation of application No. 14/326,413, filed on Jul. 8, 2014, now Pat. No. 9,497,664.

(30) Foreign Application Priority Data

Jul. 8, 2013   (KR) .......................... 10-2013-0079691
Jul. 12, 2013  (KR) .......................... 10-2013-0082253

(51) Int. Cl.
*H04L 12/26* (2006.01)
*H04W 28/08* (2009.01)
(Continued)

(52) U.S. Cl.
CPC ........... *H04W 28/08* (2013.01); *H04W 48/14* (2013.01); *H04W 74/085* (2013.01); *H04W 84/12* (2013.01)

(58) Field of Classification Search
CPC ... H04W 28/08; H04W 48/14; H04W 74/085; H04W 84/12
See application file for complete search history.

(56) References Cited

U.S. PATENT DOCUMENTS 7,752,629 B2    7/2010  Revanuru et al.
9,510,234 B2 *  11/2016 Kim .................. H04W 28/0289
(Continued)

FOREIGN PATENT DOCUMENTS

CN    102165737 A    8/2011
EP      2563070 A1    2/2013
(Continued)

OTHER PUBLICATIONS

Notification of Reasons for Refusal dated Jun. 13, 2016 in connection with Japanese Application No. 2015-555943, 6 pages.
(Continued)

*Primary Examiner* — Kevin Mew

(57) ABSTRACT

The present disclosure relates to a technology for providing a service of effectively transmitting and receiving data by simultaneously using a 3GPP system and a non-3GPP system in a network in which the 3GPP system and the non-3GPP system coexist. A communication method of a non-3GPP access network entity according to embodiments of the present disclosure includes receiving overload status information from a gateway; receiving a session management request message from a user equipment (UE); and transmitting a session management reject message comprising a back-off timer to the UE. According to the embodiment
(Continued)

of the present disclosure, when a specific PDN (or APN) is overloaded, the overload state can be controlled.

18 Claims, 15 Drawing Sheets

(51) Int. Cl.
*H04W 48/14* (2009.01)
*H04W 74/08* (2009.01)
*H04W 84/12* (2009.01)

(56) References Cited

U.S. PATENT DOCUMENTS

| | | | |
|---|---|---|---|
| 9,648,515 B2* | 5/2017 | Velev | H04W 28/12 |
| 9,661,525 B2* | 5/2017 | Rajadurai | H04W 28/0289 |
| 2005/0273456 A1 | 12/2005 | Revanuru et al. | |
| 2010/0281157 A1 | 11/2010 | Ramankutty et al. | |
| 2011/0075675 A1* | 3/2011 | Koodli | H04L 12/14 370/401 |
| 2011/0145407 A1 | 6/2011 | Pascual Avila et al. | |
| 2011/0199905 A1* | 8/2011 | Pinheiro | H04W 4/005 370/235 |
| 2011/0305138 A1 | 12/2011 | Huomo et al. | |
| 2012/0115492 A1 | 5/2012 | Liao | |
| 2012/0275401 A1 | 11/2012 | Sun | |
| 2013/0005332 A1 | 1/2013 | Sedlacek et al. | |
| 2013/0012204 A1 | 1/2013 | Kim et al. | |
| 2013/0016608 A1* | 1/2013 | Tiwari | H04W 4/22 370/230 |
| 2013/0039244 A1 | 2/2013 | Sun | |
| 2013/0088956 A1 | 4/2013 | Zhou et al. | |
| 2013/0201823 A1* | 8/2013 | Gupta | H04W 28/12 370/230 |
| 2013/0201870 A1* | 8/2013 | Gupta | H04W 4/005 370/254 |
| 2013/0272120 A1* | 10/2013 | Ai | H04W 8/02 370/230 |
| 2013/0286828 A1 | 10/2013 | Cho et al. | |
| 2014/0233390 A1* | 8/2014 | Schmid | H04L 47/125 370/236 |
| 2014/0293796 A1* | 10/2014 | Jeong | H04M 15/66 370/236 |
| 2014/0369197 A1* | 12/2014 | Stenfelt | H04W 28/0289 370/235 |
| 2015/0131437 A1 | 5/2015 | Kim et al. | |
| 2015/0141011 A1* | 5/2015 | Jeong | H04W 8/02 455/435.3 |
| 2016/0112896 A1* | 4/2016 | Karampatsis | H04W 28/0252 370/230.1 |
| 2016/0156748 A1* | 6/2016 | Yang | H04L 47/24 370/328 |

FOREIGN PATENT DOCUMENTS

| | | |
|---|---|---|
| EP | 2663122 | 11/2013 |
| KR | 10-2009-0119081 A1 | 11/2009 |
| WO | WO 2012/093832 | 7/2012 |

OTHER PUBLICATIONS

3GPP TR 23.843 V0.8.0, "3rd Generation Partnership Project; Technical Specification Group Services and System Aspects; Study on Core Network Overload Solutions; (Release 12)", Apr. 2013, 39 pages.
Ericsson, et al., "Clarification to Control Protocol in Solution 1 Tunneled Approach with Dedicated UE-TWAG Control Protocol", SA WG2 Meeting #96, S2-131317, Apr. 8-12, 2013, San Diego, California, 8 pages.
Alcatel-Lucent, et al., "Pseudo-CR on Overload Control on S2a/S2b", 3GPP TSG CT WG4 Meeting #64, C4-140078, Guangzhou, The Republic of China, Jan. 20-24, 2014, 12 pages.
Extended European Search Report dated Dec. 18, 2015 in connection with European Application No. 14823564.1, 7 pages.
International Search Report dated Oct. 14, 2014 in connection with International Application No. PCT/KR2014/006070, 3 pages.
Foreign Communication from Related Counterpart Application; Chinese Patent Application No. 201480004283.5; First Office Action dated Oct. 30, 2017; 30 pages.

\* cited by examiner

APPARATUS AND METHOD FOR CONTROLLING CONTROL OVERLOAD IN WLAN SYSTEMS

CROSS-REFERENCE TO RELATED APPLICATION(S) AND CLAIM OF PRIORITY

The present application is a continuation of U.S. patent application Ser. No. 14/326,413, filed on Jul. 8, 2014, which claims the benefit under 35 U.S.C. § 119(a) to Korean Patent Application Serial Nos. 10-2013-0079691 and 10-2013-0082253, which were filed in the Korean Intellectual Property Office on Jul. 8, 2013 and Jul. 12, 2013, the entire content of which are hereby incorporated by reference.

TECHNICAL FIELD

The present disclosure relates to a technology for providing a service of effectively transmitting and receiving data by simultaneously using a 3GPP system and a non-3GPP system in a network in which the 3GPP system and the non-3GPP system coexist. More specifically, the present disclosure relates to a method of controlling a network load when a network supporting a specific service is overloaded.

BACKGROUND

In general, mobile communication systems were developed to provide voice services while providing activity to users. However, the fields of use for the mobile communication systems have extended to providing data services beyond providing the voice communication service, and mobile communication systems have now developed to such a level at which they can provide high speed data service. Meanwhile, to present, resource shortages have arisen in the mobile communication systems providing services, and due to users' demands for higher speed services, more developed mobile communication systems are required.

To meet the demands, standardization of Long Term Evolution (LTE) is being progressed by the 3rd Generation Partnership Project (3GPP) as one of the next generation mobile communication systems that are being developed. The LTE is a technology of implementing high speed packet based communication with a transmission rate of up to about 100 Mbps. To this end, several methods are being discussed, including a method of reducing the number of nodes located on a communication channel by simplifying network architecture, a method of making wireless protocols closely access a wireless channel to the maximum, and the like.

In such mobile communication systems, user equipment can simultaneously use a plurality of different types of networks. In particular, the user equipment can simultaneously use 3GPP access networks such as GERAN (GSM (Global System for Mobile communications) EDGE (Enhanced Data Rates for GSM Evolved) Radio Access Network)/UTRAN (UMTS (Universal Mobile Telecommunication System) Terrestrial Radio Access Network)/E-UTRAN (Evolved UMTS Terrestrial Radio Access Network) and non-3GPP access networks such as WLAN. For example, the user equipment may access WLAN for different traffic to transmit/receive data while accessing E-UTRAN to transmit/receive data.

SUMMARY

When the user equipment uses services connected to a specific Packet Data Network (PDN) through the non-3GPP system, a PDN connection has to be created from the user equipment to a Packet Data Network Gateway (P-GW). If the specific PDN (e.g., a PDN using an Internet Protocol Multimedia Service Access Point Name (IMS APN)) is overloaded, a new PDN connection may be created for the overloaded PDN, or it would be difficult to provide services using the previously created PDN connection. Furthermore, if the user equipment continuously makes a request for creating a PDN connection for the overloaded PDN, the overload state will also be further aggravated. Accordingly, when the specific PDN (or APN) is overloaded, a method is required for controlling the overloaded state.

To address the above-discussed deficiencies, it is a primary object to provide a communication method of user equipment is provided. The communication method includes: receiving configuration information according to overload of a non-3GPP access network; and determining whether a connection is to be made to the non-3GPP access network, according to the received configuration information.

The receiving of the configuration information according to the overload of the non-3GPP access network may include: receiving connection policy information according to the overload of the non-3GPP access network, from an Access Network Discovery & Selection Function (ANDSF) server; requesting overload state information from the non-3GPP access network according to the policy information; and receiving the overload state information from the non-3GPP access network.

The determining as to whether the connection is to be made to the non-3GPP access network includes: determining whether the overload state information is less than a threshold value contained in the policy information; and requesting a connection from the non-3GPP access network when the overload state information is less than the threshold value contained in the policy information.

The receiving of the configuration information according to the overload of the non-3GPP access network includes: receiving an Access Class (AC) of the user equipment from an ANDSF server; and receiving a barring parameter containing an application target AC from the non-3GPP access network.

The determining as to whether the connection is to be made to the non-3GPP access network includes: determining whether the application target AC contained in the barring parameter accords with the AC received from the ANDSF server; and stopping a request for the connection to the non-3GPP access network according to a pre-configured condition when the application target AC contained in the barring parameter accords with the AC received from the ANDSF server.

The receiving of the configuration information according to the overload of the non-3GPP access network includes: transmitting a connection request message containing an identifier of the user equipment to the non-3GPP access network; and receiving a connection rejection message containing a back-off timer from the non-3GPP access network.

The determining as to whether the connection is to be made to the non-3GPP access network includes: initiating the back-off timer; determining whether the back-off timer is terminated; and requesting a connection from the non-3GPP access network when the back-off timer is terminated.

In accordance with certain embodiments of the present disclosure, a communication method of a non-3GPP access network entity is provided. The communication method includes: receiving overload state information from a Packet Data Network (PDN); and transmitting information as to whether a connection of user equipment is to be made to the user equipment according to the received overload state information.

The transmitting of the information as to whether the connection of the user equipment is to be made includes: determining a barring parameter containing an Access Class (AC) of application target equipment according to the overload state information; and transmitting the barring parameter to the user equipment.

The transmitting of the information as to whether the connection of the user equipment is to be made includes: receiving, from the user equipment, a request for a connection to the non-3GPP access network containing an identifier of the user equipment; determining whether to accept the request of the user equipment for the connection, according to the overload state information; and transmitting a connection rejection message containing a back-off timer, when it is determined that the request of the user equipment for the connection has not been accepted.

In accordance with certain embodiments of the present disclosure, user equipment includes: a communication unit that communicates with a non-3GPP access network entity, a 3GPP access network entity, and an Access Network Discovery & Selection Function (ANDSF) server; and a controller that makes a control to receive configuration information according to overload of a non-3GPP access network and to determine whether a connection is to be made to the non-3GPP access network according to the received configuration information.

In accordance with certain embodiments of the present disclosure, a non-3GPP access network entity includes: a communication unit that communicates with a Packet Data Network (PDN) and user equipment; and a controller that makes a control to receive overload state information from the PDN, and to transmit information as to whether a connection of user equipment is to be made to the user equipment according to the received overload state information.

As described above, the present disclosure provides a communication method in which an overload state can be controlled when a specific PDN (or APN) is overloaded.

Effects obtainable from the present disclosure are not limited to the above mentioned features, and other features which are not mentioned may be clearly understood, through the following descriptions, by those skilled in the art of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. Hereinafter, embodiments of the present disclosure will be described with reference to the accompanying drawings. Further, in the following description within the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be determined based on the contents throughout the specification.

Also, in the following detailed description of embodiments of the present disclosure, a basic 3GPP LTE system will be considered as a main subject, and in a case of a non-3GPP access network, a Wireless Local Area Network (WLAN) will be considered as a main subject. However, subject matters of embodiments of the present disclosure may be applied even to other communication/computer systems having a similar technical background and a similar system form without departing from the scope of the present disclosure. This applicability can be determined by those skilled in the art in the technical field of the present disclosure.

Figure 1:
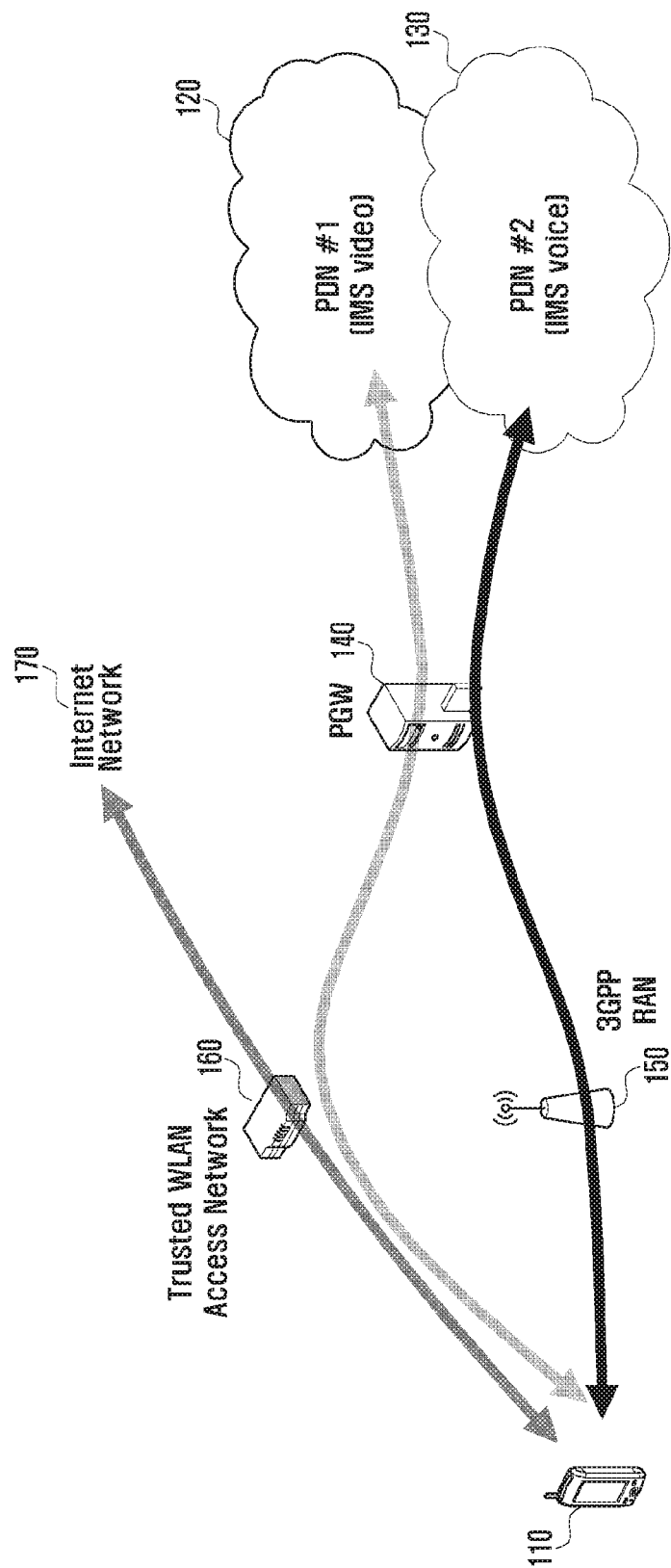
FIG. 1 illustrates an example of transmitting and receiving data by simultaneously using a 3rd Generation Partnership Project (3GPP) access network and a non-3GPP access network according to embodiments of the present disclosure.

FIG. 1 illustrates an example of transmitting and receiving data by simultaneously using a 3rd Generation Partnership Project (3GPP) access network and a non-3GPP access network according to embodiments of the present disclosure.

Referring to FIG. 1, a Wireless Local Area Network (WLAN) may be used as the non-3GPP access network. As illustrated in FIG. 1, user equipment 110, while transmitting data by creating one or more Packet Data Network (PDN) connections 120 and 130 through a 3GPP radio access network (RAN) 150, can transmit data by creating other PDN connections 120 and 130 through a WLAN 160. Other pieces of data may be transmitted in the form of Non-Seamless WLAN offloading (NSWO) in which the WLAN 160 is directly connected to an Internet network 170 to be offloaded.

In particular, as illustrated in FIG. 1, the user equipment 110, when accessing specific PDNs (in the embodiment, two PDNs, namely, the PDN 120 having an IP Multimedia Subsystem (IMS) video as an Access Point Name (APN) and the PDN 130 having an IMS voice as an APN), for example, through the Trusted WLAN Access Network (TWAN) 160, may create PDN connections through a Packet Data Network Gateway (P-GW) 140. At this time, if a particular PDN is overloaded, it may be difficult or impossible to create a new PDN for the corresponding PDN or to modify context of the PDN (e.g., a Quality of Service (QoS) parameter, etc.). Here, the term "overload" implies that the number (or an amount) of requests, tasks, or data generated or input for a specific network entity is larger than that of requests, tasks, or data that can be processed. Furthermore, the term "overload" can also imply that a PDN itself interworked with a P-GW is overloaded or a P-GW at an end of a specific PDN is overloaded. Moreover, in describing the present disclosure, a specific PDN may be used as the same meaning as a specific APN. In addition, the term "overload" may be used as having the same meaning as "congestion."

Figure 2:
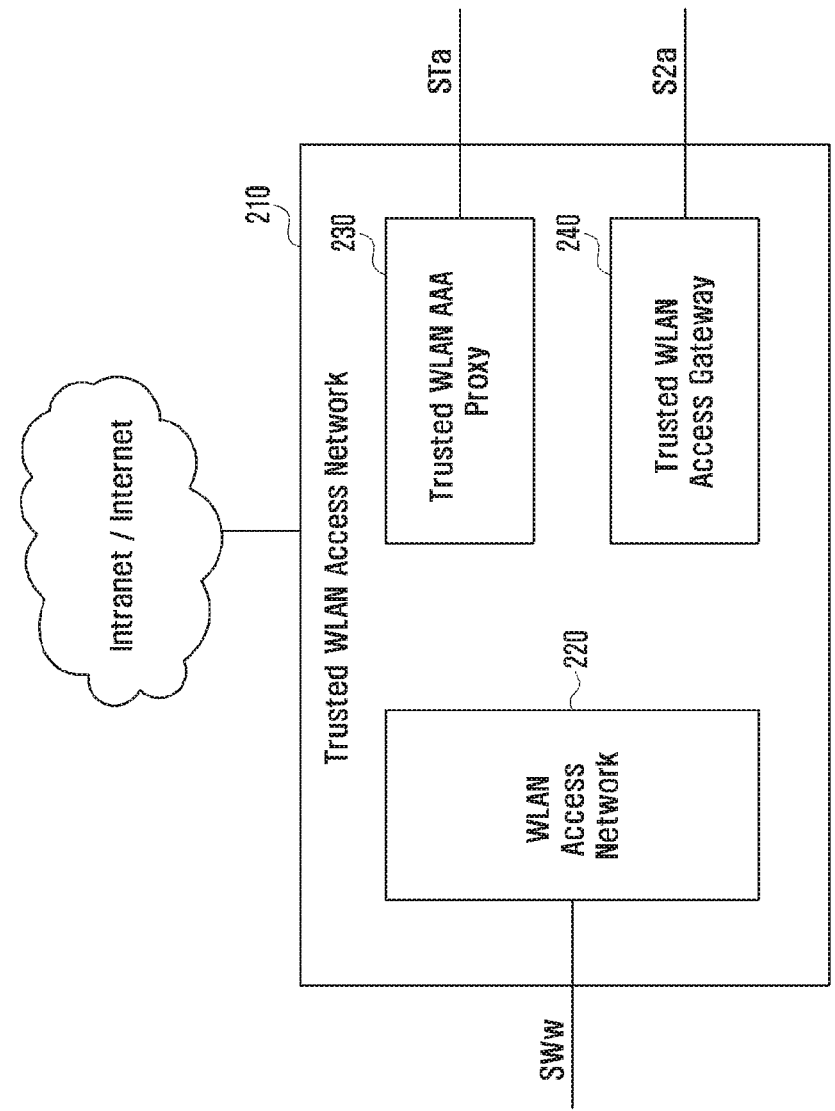
FIG. 2 illustrates a block diagram example of a Trusted WLAN Access Network (TWAN) according to embodiments of the present disclosure.

FIG. 2 is a block diagram illustrating an example of a Trusted WLAN Access Network (TWAN) according to embodiments of the present disclosure.

Referring to FIG. 2, a Trusted WLAN Access Network (TWAN) 210 includes a WLAN Access Network 220 configured with one or more WLANs, a Trusted WLAN Authentication, Authorization, and Accounting (AAA) Proxy 230 for interworking with AAA, and a Trusted WLAN Access Gateway (TWAG) 240 connecting the WLAN Access Network 210 and a P-GW (not illustrated). An interface between the TWAG 240 and the P-GW is referred to as S2a. A protocol such as a General Packet Radio Service (GPRS) Tunneling Protocol (GTP) or a Proxy Mobile Internet Protocol (PMIP) can be used in the TWAN 210. The above structure is only a logical structure, and, in practice, a physical configuration may be more free.

Hereinafter, a method for solving the above-described problem, namely the overload of a specific PDN (or APN), will be described through embodiments. However, it is apparent to those skilled in the art to which the present disclosure pertains that the present disclosure is not limited to the embodiments and other modified embodiments based on the spirit of the present disclosure can be made in addition to the embodiments disclosed herein. For example, even if overload is not limited to a specific PDN (or APN), when requests or services that have to be processed are concentrated, the TWAG may be overloaded.

In describing the present disclosure, while a network configuration including the TWAN will be mainly described for brevity of description, a main subject matter of the present disclosure may be employed for any situation of utilizing the PDN through the non-3GPP access network. In the present specification, the TWAN 210 be used along with the WLAN for convenience of description. For example, when the non-3GPP access network corresponds to the Untrusted WLAN access network rather than the TWAN, the TWAG 240 of the TWAN 210 can be changed to an enhanced Packet Data Gateway (ePDG). Furthermore, while an entity communicating with User Equipment (UE) is limited to the TWAN 210 for brevity of description, but the entity with which the actual UE communicates through a protocol of messages which the actual UE exchanges may be at least one element within the TWAN 210 (i.e., at least one of the WLAN access network 220, the TWAG 240, and the TWAP 230). For example, beacon messages may be transmitted by the WLAN access network 220 within the TWAN 210. Furthermore, an Access Network Query Protocol (ANQP) method can be applied between the UE and the WLAN access network 220 within the TWAN 210, an ANQP server connected thereto, or the TWAG 240. Moreover, a WLAN control layer message can be exchanged between the UE and the TWAG 240.

Figure 3:
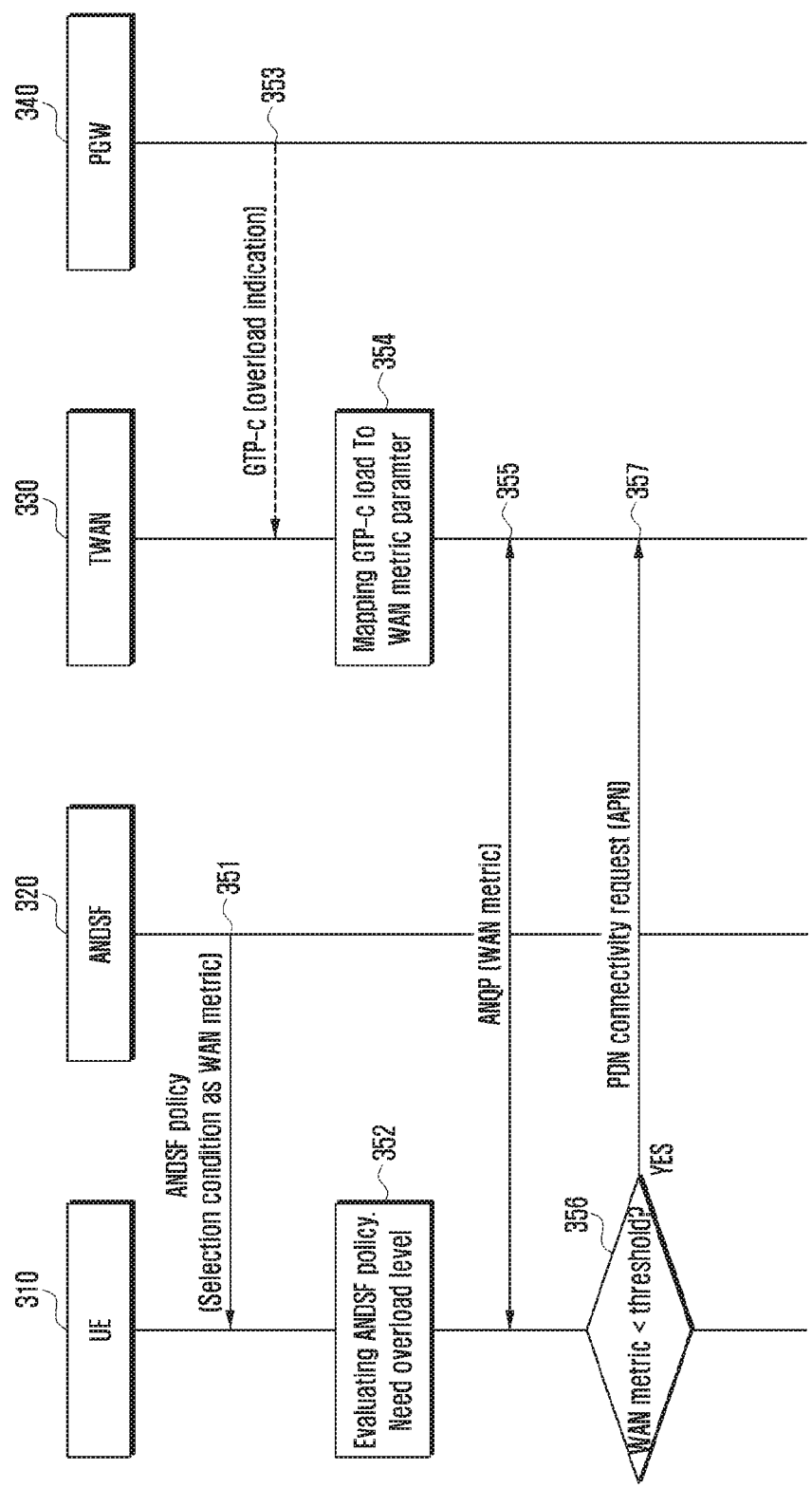
FIG. 3 illustrates a signal flow diagram of a method of controlling a network load when a network is overloaded according to embodiments of the present disclosure.

FIG. 3 illustrates a signal flow diagram of a method of controlling a network load when a network is overloaded according to embodiments of the present disclosure.

Referring to FIG. 3, according to embodiments of the present disclosure, overload of a network may be controlled using an Access Network Discovery & Selection Function (ANDSF).

As illustrated in FIG. 3, in communication 351, an ANDSF server 320 (or an Open Mobile Alliance—Device Management (OMA-DM) server at a similar level thereto) configures, for user equipment 310, a policy to select a WLAN and transmit traffic only when a state of a network to which the WLAN is connected (e.g., Wide Area Network (WAN) metrics, etc.) is satisfied. Here, a state condition of the network to which the WLAN included in the policy is connected is used as a threshold value. According to an embodiment, such a policy can also be configured in the user equipment 310 in advance, without being transferred from the server (such as the ANDSF 320) to the user equipment 310.

In process block 352, the user equipment 310 evaluates the ANDSF policy to determine whether an overload situation of the WLAN has been configured as a condition. When the UE 310 determines in step 352 that there is traffic that can be transmitted through the WLAN by the policy, and the overload situation of the WLAN has been configured as the condition, the user equipment 310 performs a process of obtaining overload state information for a WLAN 330 (e.g., a TWAN) in process 355. For example, in process 355, the user equipment 310 inquires the WLAN 330 of the WAN metrics. According to an embodiment, a method such as an Access Network Query Protocol (ANQP) can be used in process 355.

Meanwhile, if a specific PDN (not illustrated) is overloaded, the overload state information is transferred to the TWAN 330 in communication 353. In communication 353, a P-GW 340 transfers the overload state information of the specific PDN to the TWAN 330 using a GTP control message. In process block 354, the TWAN 330 stores the overload state information of the PDN, which has been transferred in communication 353. The TWAN 330 changes the overload state information of the PDN to one parameter of the WAN metrics (e.g., a downlink speed, an uplink speed, a downlink load, an uplink load, or the like), and stores the parameter. In process 355, when the user equipment 310 requests the overload state information from the TWAN 330, the TWAN 330 transfers the overload state information stored in process block 354 to the user equipment 310.

After receiving the overload state information of the specific PDN from the TWAN 330 in process 355, the user equipment 310 determines, in process block 356, whether the overload state is less than the threshold value included in the policy that has been received in communication 351. When the network overload state received from the WLAN 330 is less than the threshold value included in the policy, the user equipment 310 performs a Session Management (SM) request (e.g., a request for creating a PDN connection, a request for moving the PDN, a request for modifying a parameter of the PDN connection, or the like) for the corresponding PDN in communication 357.

Meanwhile, even if overload is not limited to the specific PDN (or APN), the TWAN 330 (particularly, the TWAG) may be overloaded due to concentration of requests or services which have to be processed. Even in this case, the overload can be controlled using the same method as the above-described embodiment, and this method may be implemented using a policy in which a specific PDN (or APN) is not specified and overload state information.

Figure 4:
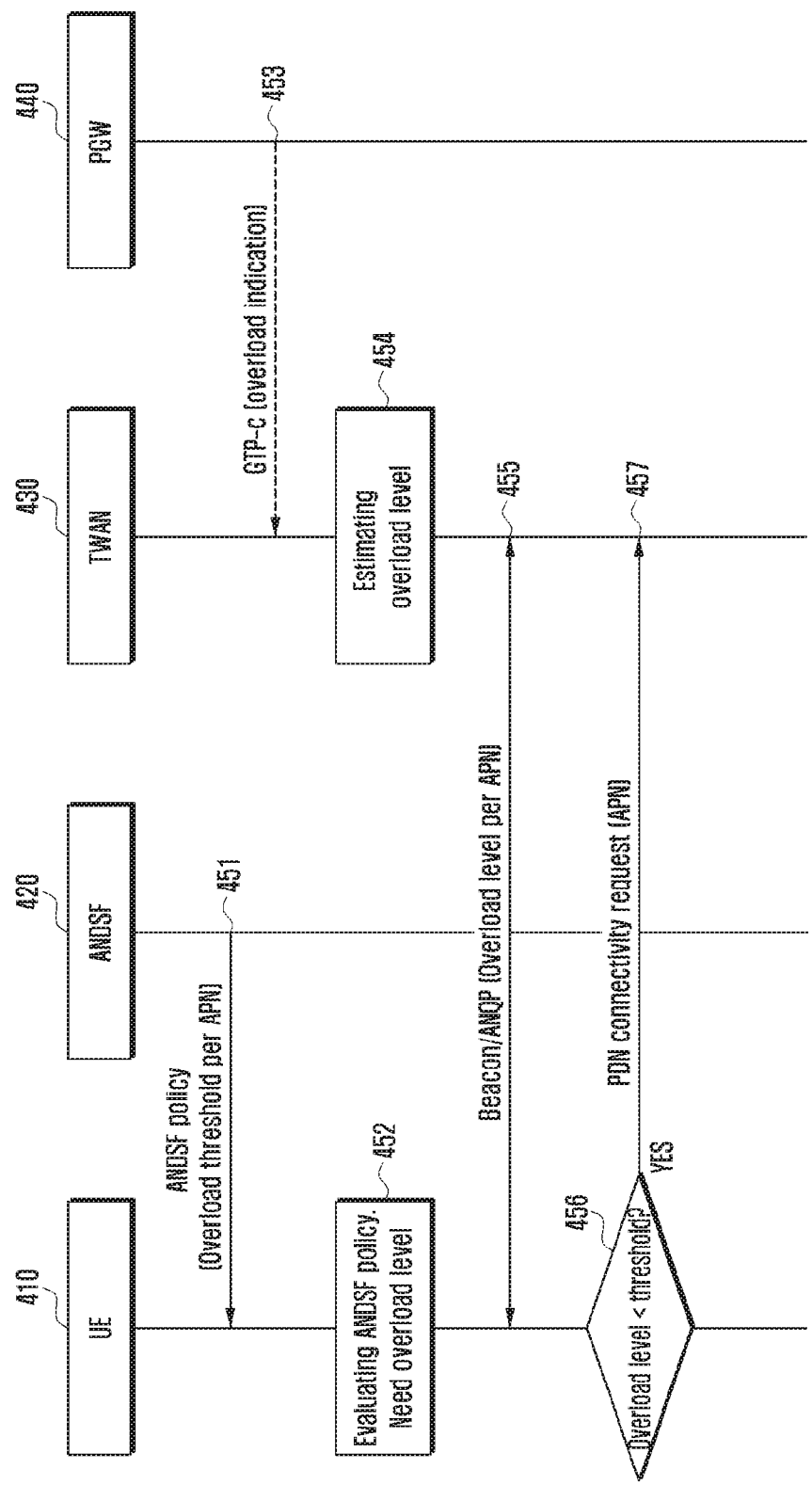
FIG. 4 illustrates a signal flow diagram of a method of controlling a network load when a network is overloaded according to embodiments of the present disclosure.

FIG. 4 is a signal flow diagram of a method of controlling a network load when a network is overloaded according to another embodiment of the present disclosure.

Referring to FIG. 4, according to embodiments of the present disclosure, network overload can be controlled using an ANDSF policy.

As illustrated in FIG. 4, in communication 451, an ANDSF server 420 (or an OMA-DM server at a similar level thereto) configures, for user equipment 410, a policy to select a WLAN and transmit traffic only when an overload condition of a PDN to which the WLAN is connected is satisfied. Here, a configuration for each PDN is presented using a different APN. Furthermore, a state condition of the network to which the WLAN included in the policy is connected is used as a threshold value. Namely, for each APN, the overload state condition is included in the policy. The policy can also be configured in advance in the user equipment 410 without being transferred from the server such as the ANDSF 420 to the user equipment 410.

In process block 452, the user equipment 410 evaluates the ANDSF policy to determine whether an overload situation of the WLAN has been configured as a condition. When the UE 410 determines in process block 452 that there is traffic which can be transmitted through the WLAN by the policy, and the overload situation of the WLAN has been configured as the condition, the user equipment 410 obtains overload state information for a WLAN 430 (e.g., a TWAN) in process 455. For example, in process 455, the user equipment 410 inquires the WLAN 430 of an overload state of a specific APN. According to certain embodiments, a method such as an Access Network Query Protocol (ANQP) can be used in process 455. A request message from the user equipment 410 to the WLAN 430 includes information representing that the message is associated with an inquiry as to whether the specific PDN (or APN) is in the overload state.

Meanwhile, if the specific PDN (not illustrated) is overloaded, the overload state information is transferred to the TWAN 330 in communication 453. In communication 453, according to certain embodiments, a P-GW 440 transfers the overload state information of the specific PDN to the TWAN 430 using a GTP control message. In process block 454, the TWAN 430 stores the overload state information for each PDN or APN. In communication 455, when the user equipment 410 requests the overload state information from the TWAN 430, the TWAN 430 transfers the overload state information stored in process block 454 to the user equipment 410.

After receiving the overload state information of the specific PDN from the TWAN 330 in communication 455, the user equipment 410 determines, in process block 456, whether the overload state is less than the threshold value included in the policy which has been received in communication 451. When the network overload state received from the WLAN 430 is less than the threshold value included in the policy, the user equipment 410 performs a session management request for the corresponding PDN in communication 457.

Meanwhile, even if the overload is not limited to the specific PDN (or APN), the TWAN 430 (particularly, the TWAG) may be overloaded due to concentration of requests or services which have to be processed. Even in this case, the overload can be controlled using the same method as the above-described embodiment, and this method can be implemented using a policy, in which a specific PDN (or APN) is not specified, and overload state information.

FIG. illustrates is a signal flow diagram of a method of controlling a network load when a network, according to another embodiment of the present disclosure, is overloaded.

Figure 5:
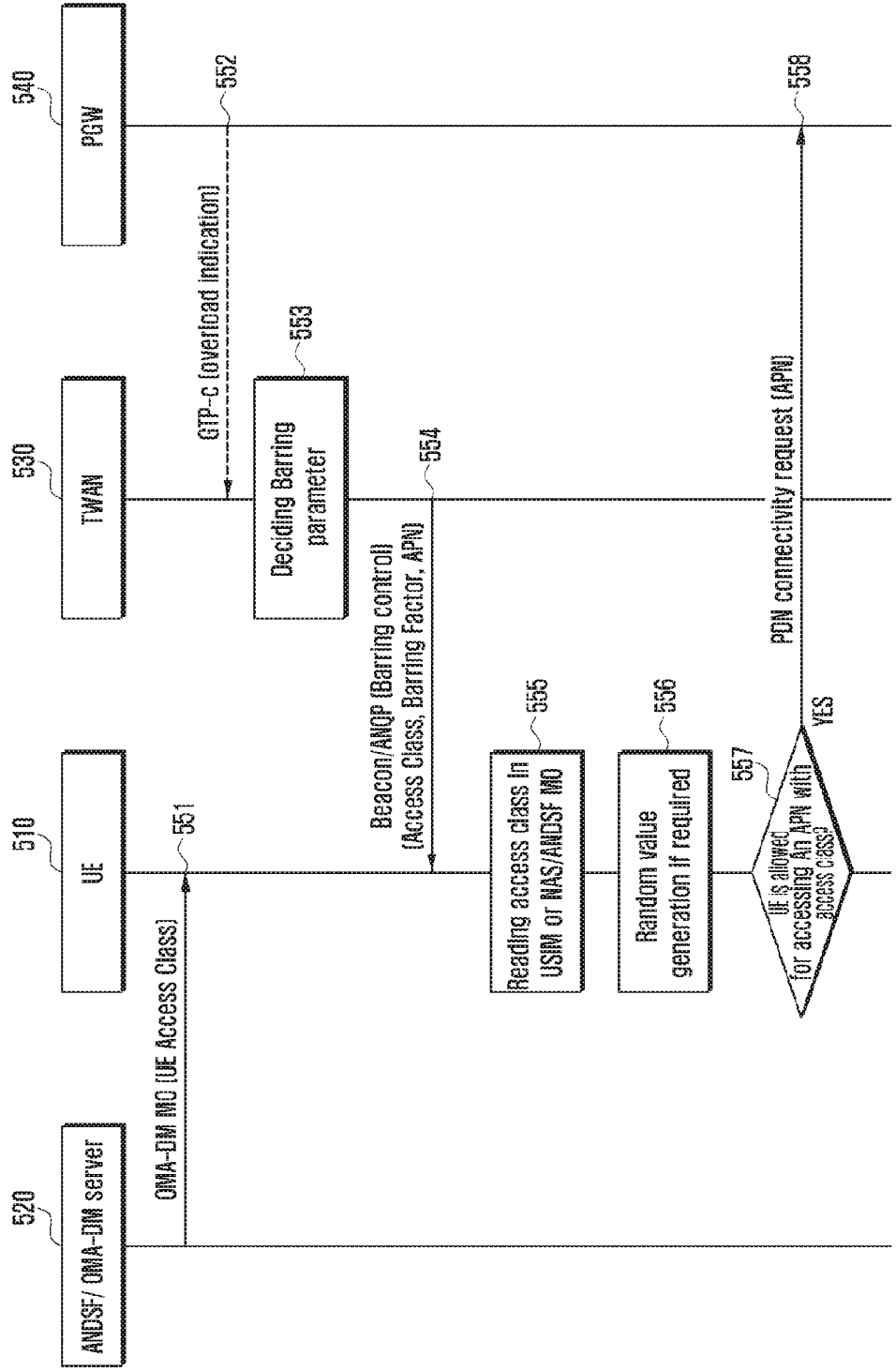
FIG. 5 illustrates a signal flow diagram of a method of controlling a network load when a network is overloaded according to embodiments of the present disclosure.

Referring to FIG. 5, according to embodiments of the present disclosure, network overload can be controlled using barring configuration information.

As illustrated in FIG. 5, in communication 551, an ANDSF server or OMA-DM server 520 at a similar level thereto transfer, to user equipment 510, an Access Class (AC), which the user equipment 510 will use when accessing a network. The AC can be determined depending on a user's subscription information, and can be a value between 0 and 15. In certain embodiments, the AC may also be configured to a different value for each APN. The AC information may also be stored in advance in a Universal Subscriber Identity Module (USIM) of the user equipment 510 without being transferred from the server 520 such as the ANDSF to the user equipment 510.

Meanwhile, if a specific PDN (not illustrated) is overloaded, the overload state information may be transferred to a TWAN 530 in communication 552. At this time, according to an embodiment, a P-GW 540 may transfer the overload state information of the specific PDN to the TWAN 530 using a GTP control message. In process block 553, using the overload state information for each PDN or APN which has been transferred in communication 552, the TWAN 530 determines barring parameters; for example, a barring factor for the APN, and an application target AC. In communication 554, the TWAN 530 transmits the parameters, which have been determined in process block 553, to the user equipment 510. According to certain embodiments, the barring parameters are be transmitted to the user equipment 510 while being included in a beacon message, or can be transferred to the user equipment 510 through a method such as an ANQP.

In process block 555, the user equipment 510 identifies the barring configuration information, stored in the user equipment 510 according to communication 551, for example, the AC. Thereafter, in process block 557, based on to the above-described configuration information, the user equipment 510 determines whether the barring configuration information (i.e., the specific APN and AC), which the user equipment 510 has according to communication 551, accords with the barring configuration information, which the network 530 has provided to the user equipment 510 in communication 554. When the barring configuration information stored in the user equipment 510 accords with the barring APN (or a combination of the APN and the AC) which the network 530 has transmitted to the user equipment 510, the user equipment 510 does not perform a session management request for the corresponding APN. However, when it is determined that the corresponding APN is accessible APN according to the AC stored in the user equipment 510, the user equipment 510 performs a session management request for the corresponding APN in communication 558.

According to certain embodiments, if the barring configuration information provided by the network 530 includes a barring factor, the user equipment 510 generates a random value in process block 556 to perform a session management request with a probability controlled by the barring factor. If the barring information provided by the network includes a time value, a determination may be made that the barring configuration is valid within the time.

Meanwhile, even if the overload is not limited to the specific PDN (or APN), the TWAN (particularly, the TWAG) may be overloaded due to concentration of requests or services which have to be processed. Even in this case, the overload can be controlled using the same method as the above-described embodiment, and this method can be implemented using barring information in which a specific PDN (or APN) is not specified.

Figure 6:
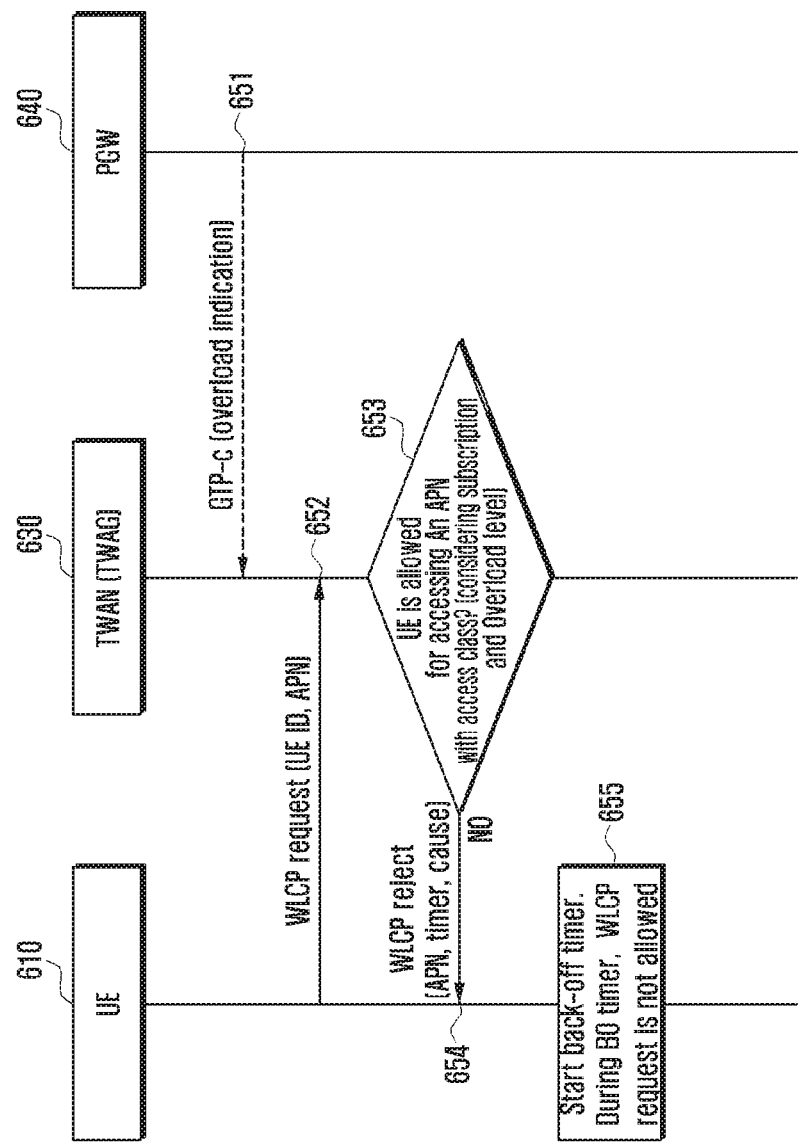
FIG. 6 illustrates a signal flow diagram of a method of controlling a network load when a network is overloaded according to embodiments of the present disclosure.

FIG. 6 illustrates a signal flow diagram of a method of controlling a network load when a network is overloaded according to another embodiment of the present disclosure.

Referring to FIG. 6, according to embodiments of the present disclosure, network overload can be controlled using a back-off timer.

As illustrated in FIG. 6, if a specific PDN (not illustrated) is overloaded, the overload state information is transferred to a TWAN 630 in communication 651. In certain embodiments, in communication 651, a gateway, such as a P-GW 640, transfers the overload state information of the specific PDN to the TWAN 630 using a GTP control message. Meanwhile, as described in the relevant description of FIG. 2, the TWAN 630 may correspond to other non-3GPP access network entity, for example, the untrusted WLAN access network. In this case, the TWAN 630 may be the ePDG.

In communication 652, when session management is required, user equipment 610 transmits a session management request message to the TWAN 630 (more specifically, the TWAG). The session management request message includes at least one of information on an ID of the user equipment 610, information on an APN of the PDN providing a service, and the like. For example, the session management request message can be a WLAN Control Protocol (WLCP) connection request message.

Thereafter, in process block 653, based on the overload state for each PDN or APN, the TWAN (TWAG) 630 determines whether to accept the session management request of the user equipment 610. In the determination process 653, the TWAN (TWAG) 630 can search for subscription information based on the ID of the user equipment 610 to allow for some parameters of the subscription information (e.g., a subscriber priority, a subscriber type, or the like). Furthermore, the determination process 653 can also include a process of obtaining subscription information of a user from AAA through the TWAN 630 based on a user ID.

If the TWAN 630 determines to reject the request of the user equipment 610 due to the overload of the PDN, the TWAN (TWAG) 630 transmits a session management rejection message to the user equipment 610 in communication 645. According to certain embodiments, the session management rejection message includes at least one of information on a cause representing that the request of the user equipment 610 has been rejected due to insufficient resources, information on the requested APN, information on a back-off timer, and the like. For example, the session management rejection message can be a WLCP connection message.

If the session management rejection message that the user equipment 610 has received from the TWAN (TWAG) 630 includes the back-off timer, the user equipment 610 may start the back-off timer in process block 655. In this case, the user equipment 610 cannot transmit a session management request message for the corresponding APN until the back-off timer is terminated. According to certain embodiments, the back-off timer can also be separately managed for each APN. If the user equipment 610 receives the session management rejection message including the back-off timer in a state where a session management request message not including the APN has been transmitted, the user equipment 610 cannot transmit the session management request message not including the APN until the back-off timer is terminated. According to an embodiment, if the user equipment 610 has the session management request message on standby, not transmitted due to the back-off timer, the user equipment 610, when the back-off timer is terminated, can transmit the session management request message on standby.

Meanwhile, even if overload is not limited to the specific PDN (or APN), the TWAN (particularly, the TWAG) may be overloaded due to concentration of requests or services which have to be processed. Even in this case, the overload can be controlled using the same method as the above-described embodiment, and this method may be implemented using a session management rejection message in which a specific PDN (or APN) is not specified and the back-off timer.

Figure 7:
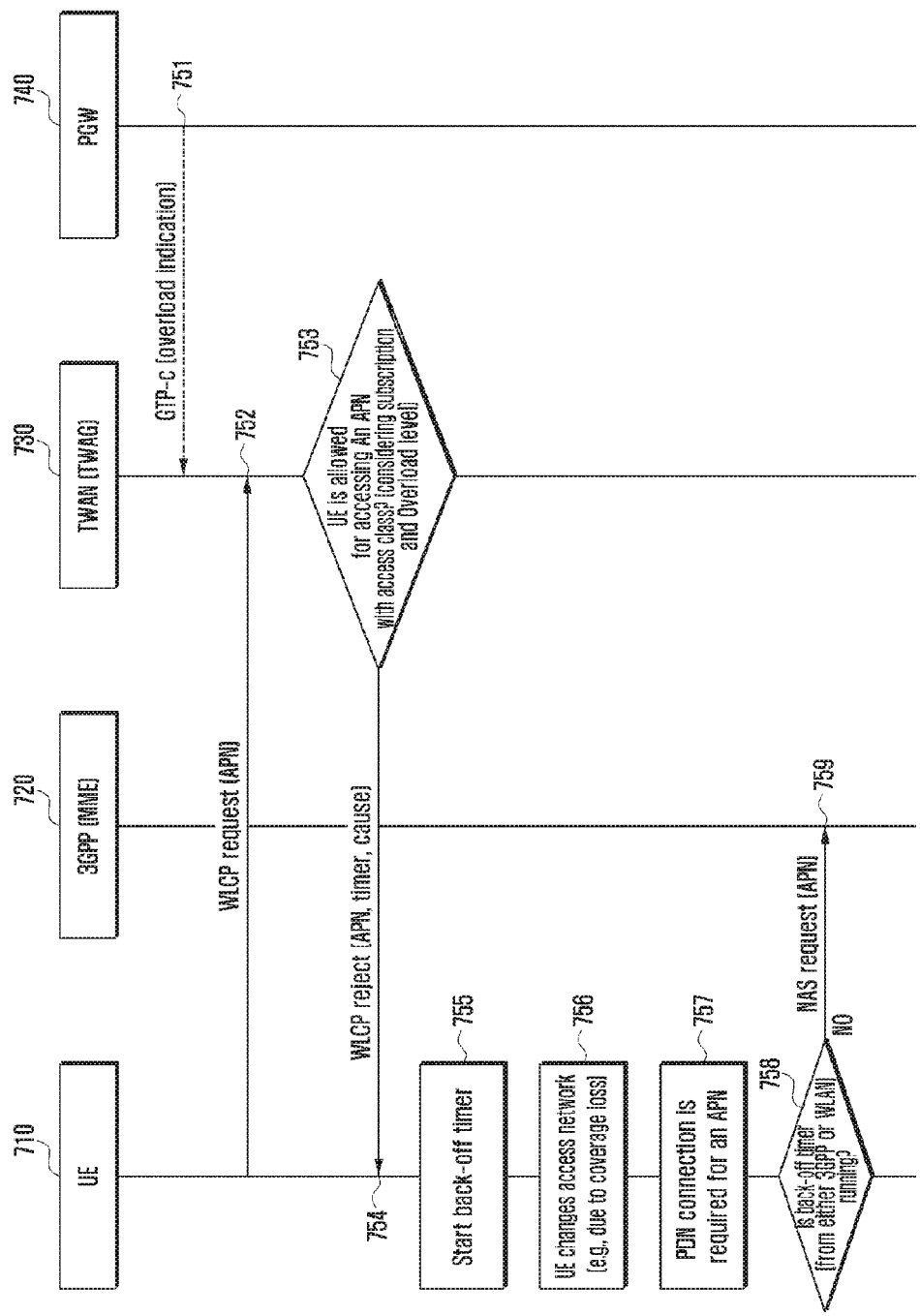
FIG. 7 illustrates a signal flow diagram of a method of controlling a network load when a network is overloaded according to embodiments of the present disclosure.

FIG. 7 illustrates a signal flow diagram of a method of controlling a network load when a network is overloaded according to another embodiment of the present disclosure.

Referring to FIG. 7, according to embodiments of the present disclosure, different systems can commutatively use a back-off timer, thereby controlling network overload. For example, a back-off timer for session management received by user equipment 710 through a 3GPP access network (E-UTRAN/UTRAN/GERAN) 720 can also be applied to a session management request of a non-3GPP access network (TWAN) 730. In contrast, a back-off timer for session management received through the non-3GPP access network 730 can also be applied to a session management request of the 3GPP access network 720. When a back-off timer is configured for a specific APN, this method may be applied to the corresponding APN irrespective of the type of access network, and when a back-off timer is configured irrespective of an APN, this method may be applied to a case of not targeting a specific APN (i.e., a case in which an APN is not included in a session management request message), regardless of the type of access network. To this end, controllers for controlling two access networks within the user equipment 710 can mutually exchange a state of the back-off timer. The reason for sharing the back-off timer received through one access network is because two access networks are connected to one PDN anyway, and when the PDN is overloaded, session management may be difficult irrespective of the type of access network.

Meanwhile, even if overload is not limited to a specific PDN (or APN), the TWAN (particularly, the TWAG) may be overloaded due to concentration of requests or services which have to be processed. Even in this case, the overload can be controlled using the same method as the above-described embodiment, and this method may be implemented using a session management rejection message, in which a specific PDN (or APN) is not specified, and a back-off timer.

Meanwhile, in describing embodiments of the present disclosure, for brevity of description, a case will be mainly described in which a back-off timer is included in a session management rejection message for rejection of a session management request of the user equipment 710. However, the back-off timer can also be included in an instruction message for network-initiated session release or modification due to network overload, and an operation of the user equipment 710 for receiving this is identical.

According to embodiments of the present disclosure, with reference to FIG. 7, a process will be described in which a back-off timer for session management received through the non-3GPP access network 730 is also applied to the 3GPP access network 720.

As illustrated in FIG. 7, if a specific PDN (not illustrated) is overloaded, the overload state information may be transferred to the TWAN 730 in step 751. At this time, according to an embodiment, a P-GW 740 may transfer the overload state information of the specific PDN to the TWAN 730 using a GTP control message.

In communication 752, when session management is required for the non-3GPP access network 730, the user equipment 710 may transmit a session management request message to the TWAN 730 (more specifically, the TWAG). At this time, the session management request message may include at least one of information on an ID of the user equipment 710, information on an APN of the PDN providing a service, and the like.

Thereafter, in process block 753, based on the overload state for each PDN or APN, the TWAN (TWAG) 730 may determine whether to accept the session management request of the user equipment 710. In the determination process, the TWAN (TWAG) 730 may search for subscription information based on the ID of the user equipment 710 to allow for some parameters of the subscription information (e.g., a subscriber priority, a subscriber type, or the like). Furthermore, the determination process may also include a process of obtaining subscription information of a user from AAA through the TWAN 730 based on a user ID.

If the TWAN 730 determines to reject the session management request of the user equipment 710 due to the overload of the PDN, the TWAN (TWAG) 730 may transmit a session management rejection message to the user equipment 710 in communication 754. According to an embodiment, the session management rejection message may include at least one of: information on a cause representing that the request of the user equipment 710 has been rejected due to insufficient resources; information on the requested APN; information on a back-off timer; and the like.

If the session management rejection message which the user equipment 710 has received from the TWAN (TWAG) 730 includes the back-off timer, the user equipment 710 may start the back-off timer in process block 755.

As described above, the back-off timer received by the user equipment 710 through the TWAN 730, which is a non-3GPP access network, may be transferred to the controller for controlling the 3GPP access network 720 of the user equipment 710. Accordingly, in process block 756, when the user equipment 710 requires a session management request through the 3GPP access network 720 (e.g., when the user equipment 710 is out of a WLAN area), the back-off timer transferred from the non-3GPP access network 730 may be applied likewise to the back-off timer received through the 3GPP access network 720. In addition, when the user equipment 710 requires a session management request such as a PDN connection for the APN in process block 757, the user equipment 710 may determine whether the back-off timer is running, in step 758. At this time, according to an embodiment, the user equipment 710 may determine whether at least one of the back-off timer for the TWAN 730 and the back-off timer for the 3GPP access network 720 is running. When it is determined that the back-off timer is running, the user equipment 710 cannot transmit the session management request message for the corresponding APN until the back-off timer is terminated. However, when it is determined that the back-off timer is not running for such a reason as the ending thereof, the user equipment 710 may transmit the session management request message to the 3GPP access network 720 in step 759.

For example, when the user equipment 710 receives a back-off timer for APN-1 through the TWAN 730, the back-off timer together with APN information may be transferred to the controller for the 3GPP access network 720 within the user equipment 710. Furthermore, when the user equipment 710 requires a session management request for APN-1 in the 3GPP access network 720, a session management request message for APN-1 may not be transmitted by the back-off timer until the back-off timer is terminated.

Figure 8:
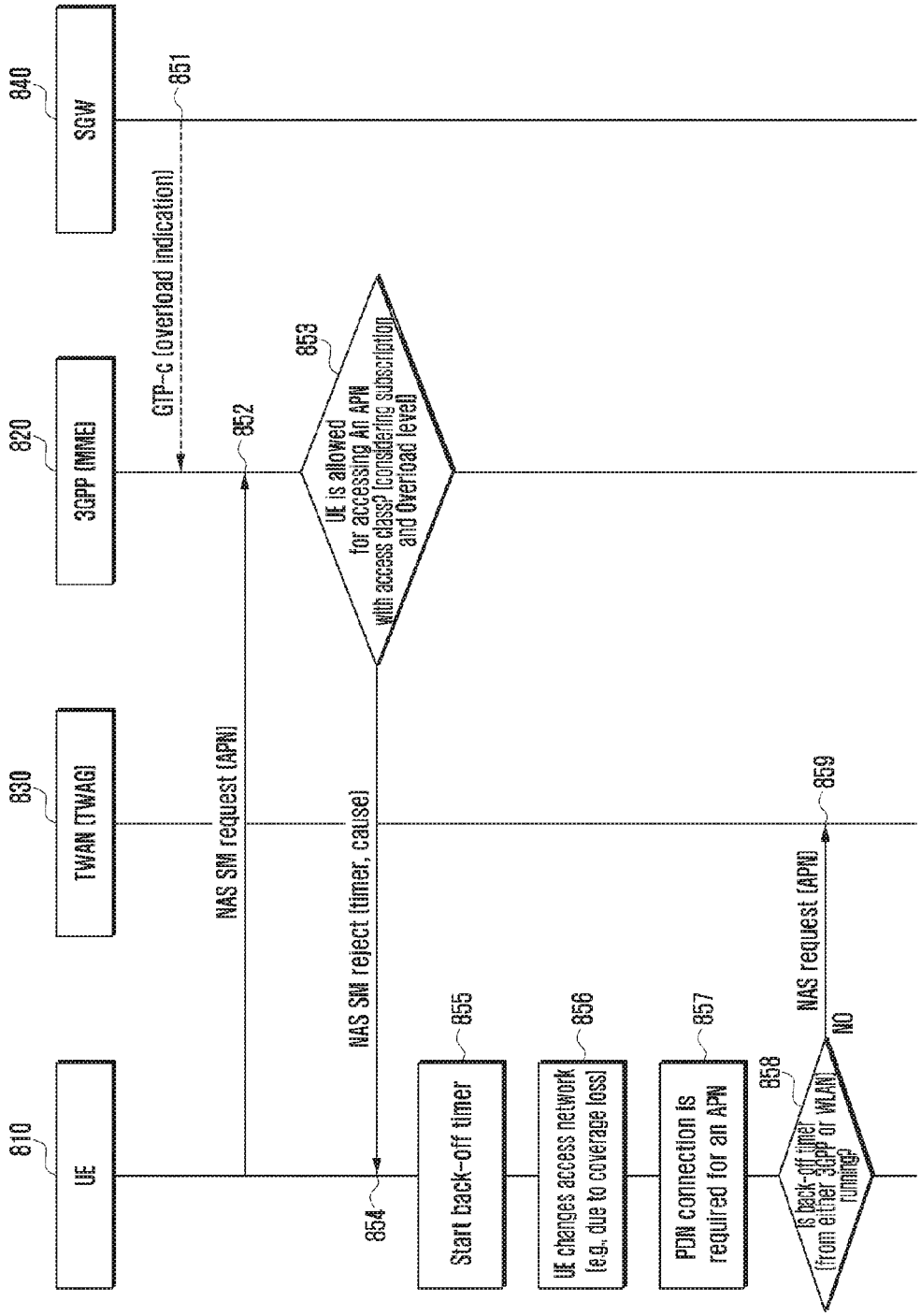
FIG. 8 illustrates a signal flow diagram of a method of controlling a network load when a network is overloaded according to embodiments of the present disclosure.

FIG. 8 is a signal flow diagram of a method of controlling a network load when a network is overloaded according to another embodiment of the present disclosure.

According to embodiments of the present disclosure, with reference to FIG. 8, a process will be described in which a back-off timer for session management received through a 3GPP access network 830 is also applied to a non-3GPP access network 820.

As illustrated in FIG. 8, if a specific PDN (not illustrated) is overloaded, the overload state information may be transferred to a Mobility Management Entity (MME) 820 through a Serving Gateway (S-GW) 840 in communication 851. At this time, according to an embodiment, the S-GW 840 may transfer the overload state information to the MME 820 using a GTP control message.

In communication 852, when session management is required for the 3GPP access network 820, user equipment 810 may transmit an NAS session management request message to the MME 820 (or a Serving General Packet Radio Service Support Node (SGSN) for 2G/3G). At this time, the session management request message may include at least one of information on an ID of the user equipment 810, information on an APN of the PDN providing a service, or the like.

Thereafter, in process block 853, based on the overload state for each PDN or APN, the MME (SGSN) 820 may determine whether to accept the session management request of the user equipment 810. In the determination process, the MME (SGSN) 820 may search for subscription information based on the ID of the user equipment 810 to allow for some parameters of the subscription information (e.g., a subscriber priority, a subscriber type, or the like). Furthermore, the determination process may also include a process of obtaining subscription information of a user from a Home Subscriber Server (HSS) based on a user ID.

If the MME (SGSN) 820 determines to reject the session management request of the user equipment 810 due to the overload of the PDN, the MME (SGSN) 820 may transmit a session management rejection message to the user equipment 810. According to an embodiment, the session management rejection message may include at least one of information on a cause representing that the request of the user equipment 810 has been rejected due to insufficient resources, information on a back-off timer, or the like.

If the session management rejection message which the user equipment 810 has received from the MME (SGSN) 820 includes a back-off timer, the user equipment 810 may start the back-off timer in process block 855.

As described above, the back-off timer received by the user equipment 810 through the MME (SGSN) 820 which is a 3GPP access network may be transferred to a controller for controlling the non-3GPP access network 830 of the user equipment 810. Accordingly, in process block 856, when the user equipment 810 needs a session management request through the non-3GPP access network 830 (e.g., when the user equipment 810 is in a WLAN area), the back-off timer transferred from the 3GPP access network 820 may be applied likewise to the back-off timer received through the non-3GPP access network 830. In addition, when the user equipment 810 requires a session management request for the APN in process block 857, the user equipment 810 may determine whether the back-off timer is running, in process block 858. At this time, according to an embodiment, the user equipment 810 may determine whether at least one of the back-off timer for the MME (SGSN) 820, which is the 3GPP access network, and the back-off timer for the non-3GPP access network (WLAN) is running. When it is determined that the back-off timer is running, the user equipment 810 cannot transmit the session management request message for the corresponding APN until the back-off timer is terminated. However, when it is determined that the back-off timer is not running for such a reason as the ending thereof, the user equipment 810 may transmit the session management request message to the non-3GPP access network 830 in communication 859.

For example, when the user equipment 810 receives a back-off timer for APN-1 through the MME (SGSN) 820, the back-off timer together with APN information may be transferred to a controller for the non-3GPP access network 830 within the user equipment 810. Furthermore, when the user equipment 810 requires a session management request for APN-1 in the non-3GPP access network 830, a session management request message for APN-1 may not be transmitted by the back-off timer until the back-off timer is terminated.

Meanwhile, even if overload is not limited to a specific PDN (or APN), the TWAN (particularly, the TWAG) may be overloaded due to concentration of requests or services, which have to be processed. Even in this case, the overload may be controlled using the same method as the above-described embodiment, and this may be implemented using a session management rejection message in which a specific PDN (or APN) is not specified and a back-off timer.

According to an embodiment, in the embodiments described with reference to FIGS. 7 and 8, a method of using a back-off timer in two access networks may be as follows.

1. The method may be implemented in a form in which controllers within the user equipments 710 and 810 for controlling two access networks exchange an initial value, and then independently operate and manage a back-off timer. If a state of the back-off timer of one access network is changed (i.e., if a new back-off timer is received, or a command to terminate the back-off timer is received from the network), the controller within the user equipments 710 and 810 for controlling the other access network may be notified of this information.

2. The method may be implemented in a form in which controllers within the user equipments 710 and 810 for controlling two access networks share a back-off timer. That is, the back-off timer may be actually shared by the controllers for controlling two access networks, and the controllers for controlling two access networks may access the back-off timer to read or modify a value.

3. A controller within the user equipments 710 and 810 for controlling an access network through which an initial value of a back-off timer is directly received may manage the back-off timer. Furthermore, a controller for controlling another access network, when a session management request is generated, may determine whether a session management back-off timer for the corresponding APN (or without APN) is being executed by the controller for controlling the access network (i.e., the controller for controlling the access network through which the initial value of the back-off timer is directly received). When it is determined that the back-off timer for the access network is being executed, an implementation may also be made in a form in which the user equipments 710 and 810 do not transmit the session management request message.

In the above description, two access networks refer to the 3GPP access network (including all of E-UTRAN, UTRAN, and GERAN) and the non-3GPP access network (WLAN, etc.).

In the above-described embodiments, the exchange of information on the back-off timer and the APN between two access networks may be performed using direct communication between the controllers for controlling two access networks or via an upper manager at a higher layer than the controllers for controlling two access networks. Here, the controllers for controlling the access networks may be a 3GPP or non-3GPP modem (communication chip). Furthermore, the controllers for controlling the access networks may also be a driver for controlling the 3GPP or non-3GPP modem, or an RIL manager or Wi-Fi manager for accessing and managing the 3GPP or non-3GPP modem driver within a handset.

Figure 9:
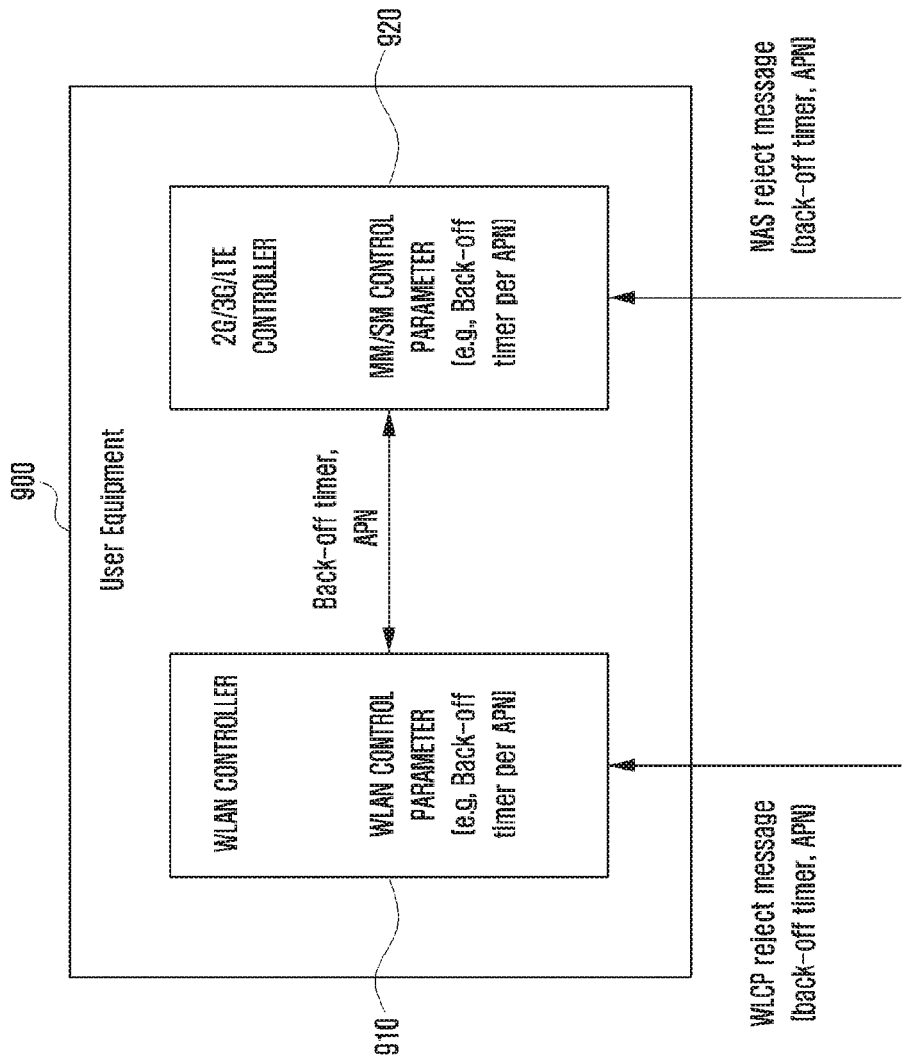
FIG. 9 illustrates a block diagram of an example of user equipment in which controllers for controlling two access networks directly communicate with each other to exchange back-off and APN information without the aid of a higher layer according to embodiments of the present disclosure.

FIG. 9 is a block diagram illustrating an example of user equipment in which controllers for controlling two access networks directly communicate with each other to exchange back-off and APN information without the aid of a higher layer.

Referring to FIG. 9, the controllers for controlling two access networks may exchange information. For example, there may be a memory area which two controllers share, or there may be a bus and a protocol through which two controllers may exchange information. As illustrated in FIG. 9, when one controller 910 or 920 for controlling one access network receives back-off and APN information, the controller may notify the other controller 920 or 910 for controlling the other access network of this information. Such an operation of exchanging the information and applying the received information may be the same as the above-described implementation options 1 to 3.

Figure 10:
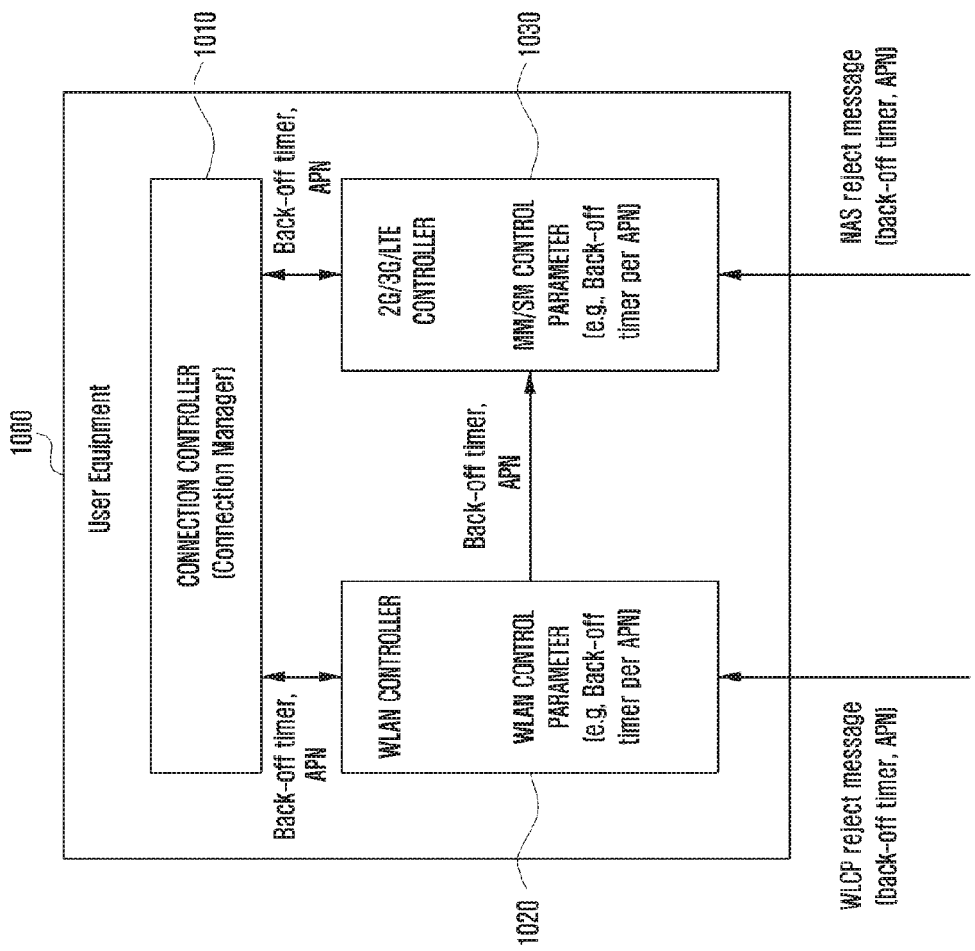
FIG. 10 illustrates a block diagram of an example of user equipment in which controllers for controlling two access networks exchange back-off and APN information through a separate control layer according to embodiments of the present disclosure.

FIG. 10 is a block diagram illustrating an example of user equipment in which controllers for controlling two access networks exchange back-off and APN information through a separate control layer.

Referring to FIG. 10, a control layer 1010 for an exchange of back-off timer and APN information between controllers 1020 and 1030 for controlling two access networks may architecturally stand above the control layers 1020 and 1030 for controlling two access networks. According to an embodiment, the connection controller 1010 on the higher layer may also be implemented in a software (SW) form such as a connection manager for directing the controller (ML manager) 1030 controlling a 3GPP access network and the controller (Wi-Fi manager) 1020 controlling a non-3GPP access network. When the controller 1020 or 1030 controlling one access network receives back-off and APN information, this information may be transferred to the separate (higher layer) controller 1010, and the separate (higher layer) controller 1010 may notify the controller 1030 or 1020 controlling the other access network of the received back-off timer and APN information. Such an operation of exchanging the information and applying the received information may be the same as the above-described implementation options 1 to 3. For example, for option 2, the shared back-off timer information (timer state and connected APN) exists in the separate (higher layer) controller 1010, and a value thereof may be modified or transferred according to requirements of the controllers 1020 and 1030 controlling two access networks.

Meanwhile, in a case where authentication for user equipment fails when the user equipment desires to receive a service through TWAN, if the user equipment repeatedly performs the authentication request, the TWAN or an authentication server (AAA or AAA proxy) of a network connected with the TWAN may be overloaded. The authentication for the user equipment may fail on account of no permission for a communication enterprise/WLAN selected by the user equipment, no roaming agreement between communication enterprises, or overload of the TWAG, the authentication server, or the connected core network.

In embodiments of the present disclosure, in order to solve the aforementioned problem, a method may be used for configuring information used to retry the authentication when the authentication for the user equipment fails and accordingly determining whether the user equipment performs a further authentication request. According to an embodiment, the configuration information for the further authentication request may be configured in advance in the user equipment, transferred to the user equipment while being included in the ANDSF policy (or rule), or transferred to the user equipment during the authentication (particularly, through an authentication rejection/failure message). The configuration information for the further authentication request may include one or more of an identifier representing whether the further request is allowed, a minimum time gap between attempts of the further request, and the maximum allowable number of attempts of the further request.

Meanwhile, when the authentication request fails once, a range in which the authentication request is considered as the further request may be limited to the same TWAN. Furthermore, the range may be limited to a configuration with the same identifier of the same TWAN (e.g., a Public Land Mobile Network (PLMN), a Service Set Identifier (SSID), or a WLAN service provider ID). For example, when the range in which the authentication request is considered as the further request is limited to the same TWAN, a configuration is made such that the further request is not allowed, and the TWAN services PLMN-1 and PLMN-2, the user equipment may select the PLMN-1 to request authentication, and if the authentication request fails, the user equipment may also not attempt the further authentication request for the PLMN-2 connected to the same TWAN.

Figure 14:
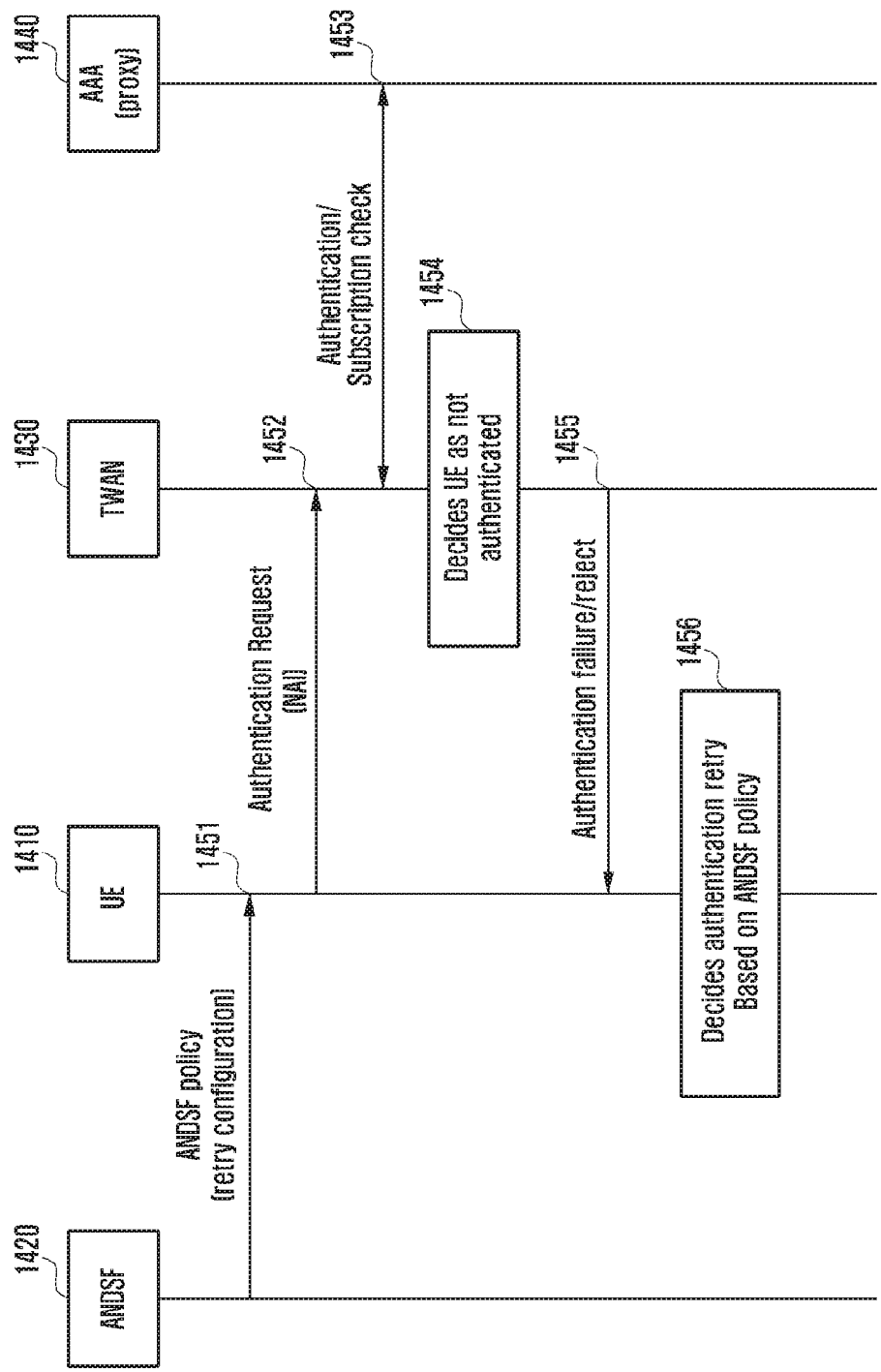
FIG. 14 illustrates a signal flow diagram of a process of transferring information on a further authentication request to user equipment based on an ANDSF according to embodiments of the present disclosure.

FIG. 14 is a signal flow diagram of a process of transferring information on a further authentication request to user equipment based on an ANDSF according to embodiments of the present disclosure.

Referring to FIG. 14, in communication 1451, when creating a policy (or rule) for user equipment 1410 and transferring it to the user equipment 1410, an ANDSF server 1420 may transfer the policy including configuration information related to a further authentication request to the user equipment 1410. More specifically, the configuration information related to the further authentication request may include one or more of an identifier representing whether the further authentication request is allowed, a minimum time gap between attempts of the further authentication request, and the maximum allowable number of attempts of the further authentication request. According to an embodiment, the configuration information related to the further authentication request may be configured for each specific TWAN, or may be configured for each specific PLMN or each service provider. The information related to the further authentication request may be included as a part of a WLAN selection policy or an Inter-System Routing Policy (ISRP) of the ANDSF policy. The user equipment 1410 having received the policy may store the configuration information related to the further authentication request.

Thereafter, in communication 1452, the user equipment 1410 may transmit an authentication request message through the selected TWAN 1430. At this time, a communication enterprise (PLMN or a service provider) of the TWAN selected by a user may also be transferred during this process. In communication 1453 and process block 1454, authentication for the user equipment 1410 is performed on an AAA proxy, and the authentication for the user equipment 1410 may fail.

When the authentication for the user equipment 1410 fails, as described above, the TWAN 1430 may transfer an authentication rejection or failure message to the user equipment 1410 in step 1455.

In process block 1456, the user equipment 1410, having received the authentication rejection or failure message, may discern failure or success of the authentication, and may determine whether to retry the authentication according to the configuration information related to the further authentication request.

According to an embodiment, if the further authentication request is not allowed, the user equipment 1410 does not perform the further request for the corresponding TWAN 1430 (PLMN/service provider selected in the authentication request when permission or non-permission of the further request is limited to the specific PLMN/service provider). Furthermore, when the further authentication request is allowed but the number of attempts of the further authentication request is restricted, the user equipment 1410 may increase a count of further authentication requests by 1 every time attempting the authentication request, and may perform the further authentication request as far as the count does not exceed the maximum number. According to an embodiment, when a time gap is configured between the attempts of the further authentication request, the user equipment 1410 may attempt the further authentication request after the minimum time gap based on a timer. The timer operation and the counting operation may be applied to each TWAN 1430 or only the specific PLMN or service provider according to configurations.

Figure 15:
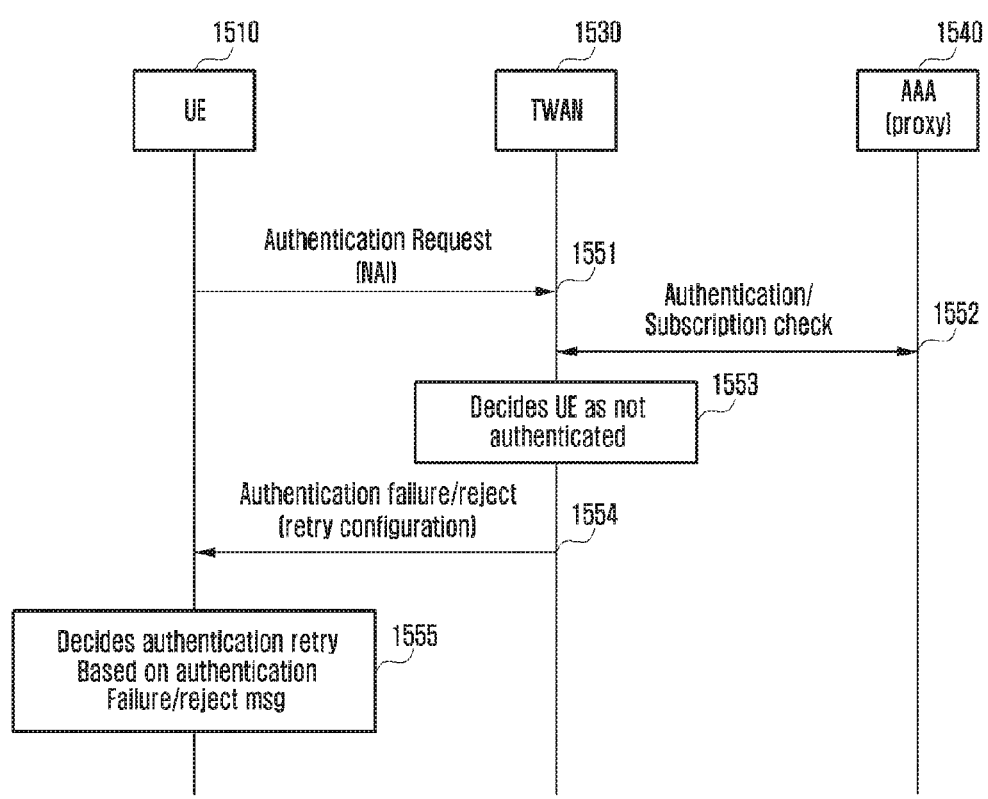
FIG. 15 illustrates a signal flow diagram of a process of transferring information on a further authentication request to user equipment during authentication according to embodiments of the present disclosure.

FIG. 15 is a signal flow diagram of a process of transferring information on a further authentication request to user equipment during authentication according to embodiments of the present disclosure.

Referring to FIG. 15, user equipment 1510 may transmit an authentication request message through a selected TWAN 1530 in communication 1551. At this time, a communication enterprise (PLMN or a service provider) of the TWAN selected by a user may also be transferred during this process. In communication 1552 and process block 1553, authentication for the user equipment 1510 is performed on an AAA proxy, and the authentication for the user equipment 1510 may fail.

When the authentication for the user equipment 1510 fails, as described above, the TWAN 1530 may transfer an authentication rejection or failure message to the user equipment 1510 in communication 1554. At this time, the authentication rejection or failure message (e.g., an EAP failure message) may include information related to a further authentication request. More specifically, the configuration information related to the further authentication request may include one or more of an identifier representing whether the further authentication request is allowed, a minimum time gap between attempts of the further authentication request, and the maximum allowable number of attempts of the further authentication request. According to an embodiment, the configuration information related to the further authentication request may be configured for each specific TWAN, or may be configured for each specific PLMN or each service provider. The user equipment receives and stores the configuration information.

In process block 1555, the user equipment 1510 having received the authentication rejection or failure message may discern failure or success of the authentication, and may determine whether to retry the authentication according to the configuration information related to the further authentication request.

According to an embodiment, if the further authentication request is not allowed, the user equipment 1510 does not perform the further request for the corresponding TWAN 1530 (PLMN/service provider selected in the authentication request when permission or non-permission of the further request is limited to the specific PLMN/service provider). Furthermore, when the further authentication request is allowed but the number of attempts of the further authentication request is restricted, the user equipment 1510 may increase a count of further authentication requests by 1 every time attempting the authentication request, and may perform the further authentication request as far as the count does not exceed the maximum number. According to an embodiment, when a time gap is configured between the attempts of the further authentication request, the user equipment 1510 may attempt the further authentication request after the minimum time gap based on a timer. The timer operation and the counting operation may be applied to each TWAN 1530 or only the specific PLMN or service provider according to configurations.

The above-described embodiment is based on the fact that the TWAN 1530 transfers the configuration information related to the further authentication request to the user equipment 1510 during the authentication. However, according to an embodiment, a modification may be made such that a message is used which a TWAG included in the TWAN 1530 sends to the user equipment. That is, included in the EAP failure message in the above-described embodiment, the configuration information related to the further authentication request may be included in a WLAN control layer message which the TWAG sends to the user equipment 1510. In addition, an operation of the user equipment 1510 having received it is not much different from that described in the above embodiment.

Figure 11:
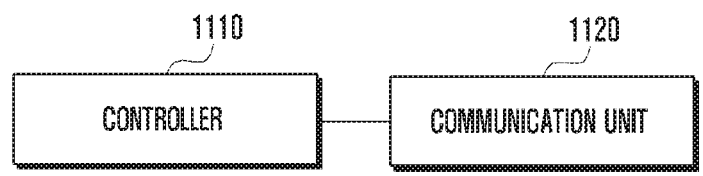
FIG. 11 illustrates a block diagram of user equipment according to embodiments of the present disclosure.

FIG. 11 is a block diagram of user equipment according to embodiments of the present disclosure.

Referring to FIG. 11, a controller 1110 controls the user equipment to perform any one operation of the above-described embodiments. For example, the controller 1110 may control to receive configuration information according to overload of a non-3GPP access network and determine whether a connection can be made to the non-3GPP access network according to the received configuration information. According to an embodiment, the controller 1110 may include controllers for controlling two access networks, namely, a non-3GPP access network and a 3GPP access network.

A communication unit 1120 transmits and receives signals according to any one operation of the above-described embodiments. For example, the communication unit 1120 may communicate with the non-3GPP access network entity, the 3GPP access network entity, and an ANDSF server.

Figure 12:
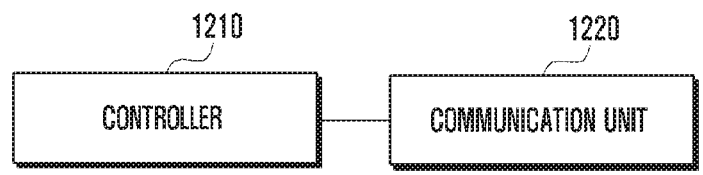
FIG. 12 illustrates a block diagram of a non-3GPP access network entity according to embodiments of the present disclosure.

FIG. 12 is a block diagram of a non-3GPP access network entity according to embodiments of the present disclosure.

Referring to FIG. 12, a controller 1210 controls a non-3GPP access network entity to perform any one operation of the above-described embodiments. For example, the controller 1210 may make a control to receive overload state information from a PDN and transmit information as to whether user equipment can be connected, to the user equipment according to the received overload state information.

A communication unit 1220 transmits and receives signals according to any one operation of the above-described embodiments. For example, the communication unit 1220 may communicate with the PDN and the user equipment.

Figure 13:
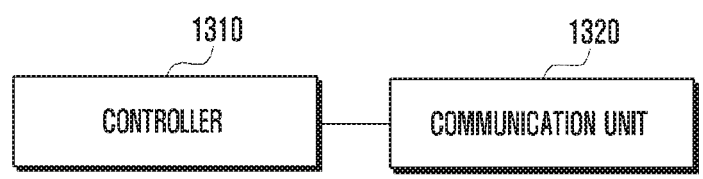
FIG. 13 illustrates a block diagram of a 3GPP access network entity according to embodiments of the present disclosure.

FIG. 13 is a block diagram of a 3GPP access network entity according to embodiments of the present disclosure.

Referring to FIG. 13, a controller 1310 controls a 3GPP access network entity to perform any one operation of the above-described embodiments. For example, the controller 1310 may make a control to determine whether to accept a session management request of user equipment based on an overload state of each PDN or APN, and transmit a session management rejection message to the user equipment.

A communication unit 1320 transmits and receives a signal according to any one operation of the above-described embodiments. For example, the communication unit 1320 may communicate with the user equipment and a non-3GPP access network entity.

Embodiments of the present disclosure disclosed in the specification and the drawings are only particular examples to easily describe the technical matters of the present disclosure and assist for understanding of the present disclosure, but do not limit the scope of the present disclosure. It is apparent to those skilled in the art that other modified examples based on the technical idea of the present disclosure can be implemented as well as the embodiments disclosed herein.

Although the present disclosure has been described with embodiments, various changes and modifications may be suggested to one skilled in the art. It is intended that the present disclosure encompass such changes and modifications as fall within the scope of the appended claims.

What is claimed is:

1. A method by an access network entity in an access network, the method comprising:
   receiving a general packet radio service tunneling protocol control (GTP-C) message including overload information from a packet data network gateway (PDN GW);
   receiving a wireless local area network (WLAN) connection protocol (WLCP) connection request message from a terminal;
   determining whether to accept the WLCP connection request message based on the overload information; and
   transmitting a WLCP connection reject message including a timer that instructs the terminal to not request a connection if the access network entity determines to reject the WLCP connection request message.

2. The method of claim 1, wherein the access network is a non-3rd generation partnership project (non-3GPP) access network, and
   wherein the access network entity comprises a trusted wireless local area network (WLAN) access network (TWAN).

3. The method of claim 1, wherein the timer instructs the terminal to not send the WLCP connection request message related to an access point name (APN) for indicated time based on the timer.

4. A method by a terminal, the method comprising:
   transmitting a wireless local area network (WLAN) connection protocol (WLCP) connection request message to an access network entity in an access network; and
   receiving a WLCP connection reject message including a timer that instructs the terminal to not request a connection, if a general packet radio service tunneling protocol control (GTP-C) message including overload information is transmitted from a packet data network gateway (PDN GW) to the access network entity, and the WLCP connection request message is determined to be rejected,
   wherein the overload information is used to determine whether to accept the WLCP connection request message.

5. The method of claim 4, wherein the access network is a non-3rd generation partnership project (non-3GPP) access network, and
   wherein the access network entity comprises a trusted wireless local area network (WLAN) access network (TWAN).

6. The method of claim 4, wherein the timer instructs the terminal to not send the WLCP connection request message related to an access point name (APN) for indicated time based on the timer.

7. A method by a packet data network gateway (PGW), the method comprising:
   transmitting a general packet radio service tunneling protocol control (GTP-C) message including overload information to an access network entity in an access network, and
   wherein the overload information is used to determine whether to accept a wireless local area network (WLAN) connection protocol (WLCP) connection request message, if the WLCP connection request message is transmitted from a terminal to the access network entity, and wherein a WLCP connection reject message including a timer that instructs the terminal to not request a connection is transmitted from the access network entity to the terminal if the WLCP connection request message is determined to be rejected.

8. The method of claim 7, wherein the access network is a non-3rd generation partnership project (non-3GPP) access network, and
   wherein the access network entity comprises a trusted wireless local area network (WLAN) access network (TWAN).

9. The method of claim 7, wherein the timer instructs the terminal to not send the connection request message related to an access point name (APN) for indicated time based on the timer.

10. An access network entity in an access network, the access network entity comprising:
    a transceiver configured to transmit and receive a signal; and
    a controller coupled with the transceiver and configured to:
      receive a general packet radio service tunneling protocol control (GTP-C) message including overload information from a packet data network gateway (PDN GW);
      receive a wireless local area network (WLAN) connection protocol (WLCP) connection request message from a terminal;
      determine whether to accept the WLCP connection request message based on the overload information; and
      transmit a WLCP connection reject message including a timer that instructs the terminal to not request a connection if the access network entity determines to reject the WLCP connection request message.

11. The access network entity of claim 10, wherein the access network is a non-3rd generation partnership project (non-3GPP) access network, and wherein the access network entity comprises a trusted wireless local area network (WLAN) access network (TWAN).

12. The access network entity of claim 10, wherein the timer instructs the terminal to not send the WLCP connection request message related to an access point name (APN) for indicated time based on the timer.

13. A terminal, the terminal comprising:
a transceiver configured to transmit and receive a signal; and
a controller coupled with the transceiver and configured to:
transmit a wireless local area network (WLAN) connection protocol (WLCP) connection request message to an access network entity in an access network; and
receive a WLCP connection reject message including a timer that instructs the terminal to not request a connection, if a general packet radio service tunneling protocol control (GTP-C) message including overload information is transmitted from a packet data network gateway (PDN GW) to the access network entity, and the WLCP connection request message is determined to be rejected,
wherein the overload information is used to determine whether to accept the WLCP connection request message.

14. The terminal of claim 13, wherein the access network is a non-3rd generation partnership project (non-3GPP) access network, and
wherein the access network entity comprises a trusted wireless local area network (WLAN) access network (TWAN).

15. The terminal of claim 13, wherein the timer instructs the terminal to not send the WLCP connection request message related to an access point name (APN) for indicated time based on the timer.

16. A packet data network gateway (PGW), the PGW comprising:
a transceiver configured to transmit and receive a signal; and
a controller coupled with the transceiver and configured to:
transmit a general packet radio service tunneling protocol control (GTP-C) message including overload information to an access network entity in an access network, and
wherein the overload information is used to determine whether to accept a wireless local area network (WLAN) connection protocol (WLCP) connection request message, if the WLCP connection request message is transmitted from a terminal to the access network entity, and
wherein a WLCP connection reject message including a timer that instructs the terminal to not request a connection is transmitted from the access network entity to the terminal if the WLCP connection request message is determined to be rejected.

17. The PGW of claim 16, wherein the access network is a non-3rd generation partnership project (non-3GPP) access network, and
wherein the access network entity comprises a trusted wireless local area network (WLAN) access network (TWAN).

18. The PGW of claim 16, wherein the timer instructs the terminal to not send the WLCP connection request message related to an access point name (APN) for indicated time based on the timer.

* * * * *